(12) United States Patent
Parsons et al.

(10) Patent No.: US 7,201,561 B2
(45) Date of Patent: Apr. 10, 2007

(54) SWASHPLATE SEAL ASSEMBLY

(75) Inventors: Wayne C. Parsons, Huntsville, AL (US); Tracy A. Conklin, Huntsville, AL (US)

(73) Assignee: United States of America, as represented by the Secretary of Army, Washington, DC (US)

( * ) Notice: Subject to any disclaimer, the term of this patent is extended or adjusted under 35 U.S.C. 154(b) by 164 days.

(21) Appl. No.: 11/134,596

(22) Filed: May 18, 2005

(65) Prior Publication Data

US 2006/0275120 A1    Dec. 7, 2006

(51) Int. Cl.
   *F04D 29/10*  (2006.01)

(52) U.S. Cl. ..................... 415/174.2; 415/230
(58) Field of Classification Search ............ 415/174.2, 415/230, 231; 277/355, 370, 375, 549, 551, 277/637
   See application file for complete search history.

(56) References Cited

U.S. PATENT DOCUMENTS 2,390,204 A * 12/1945 Curtis ...................... 417/201
3,565,447 A * 2/1971 Joachim et al. ............. 277/504
4,804,315 A   2/1989 Ferris
5,071,319 A   12/1991 McCafferty
5,074,494 A   12/1991 Doolin
5,266,008 A * 11/1993 Ehrbar ................... 416/204 R

* cited by examiner

*Primary Examiner*—Ninh H. Nguyen
(74) *Attorney, Agent, or Firm*—Jack K. Greer

(57) ABSTRACT

A swashplate seal assembly sized for rotor shaft rotation therein, including an outer cover encircling the rotor shaft and covering a sealing ring having an inner circumference on which a resilient sealing wiper is inwardly disposed. The outer cover, sealing ring and resilient sealing wiper are sectioned in respective like-configured curved segments for disassembly without removing adjacent segments during inspections. Inboard of the sealing ring is a flanged seal ring having an outer surface diameter limited in size to allow positioning the seal ring within the sealing wiper. The seal ring is fitted on an outer perimeter of a bearing retainer positionable within the sealing ring, thereby positioning the seal ring outer surface in sliding engagement with the sealing wiper during rotor shaft rotation. The outer cover positioning and the engaging relationship between seal ring and sealing wiper operate to minimize contaminants intrusion along the rotor shaft during rotation.

20 Claims, 7 Drawing Sheets

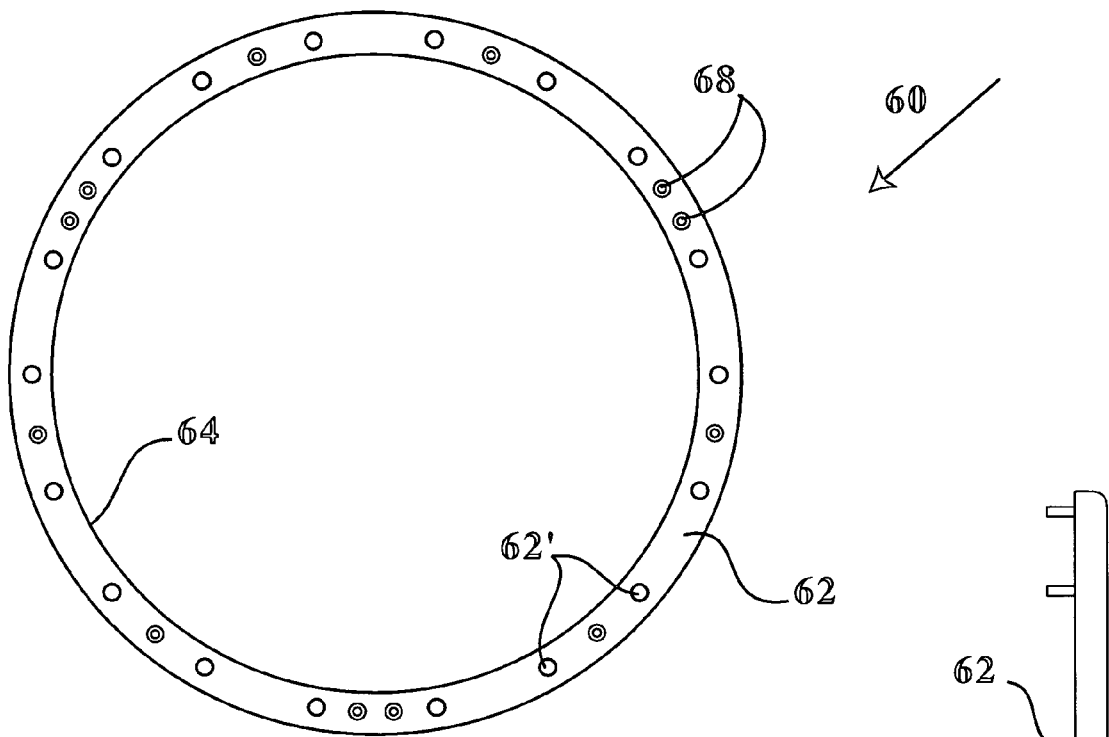
FIG. 5a
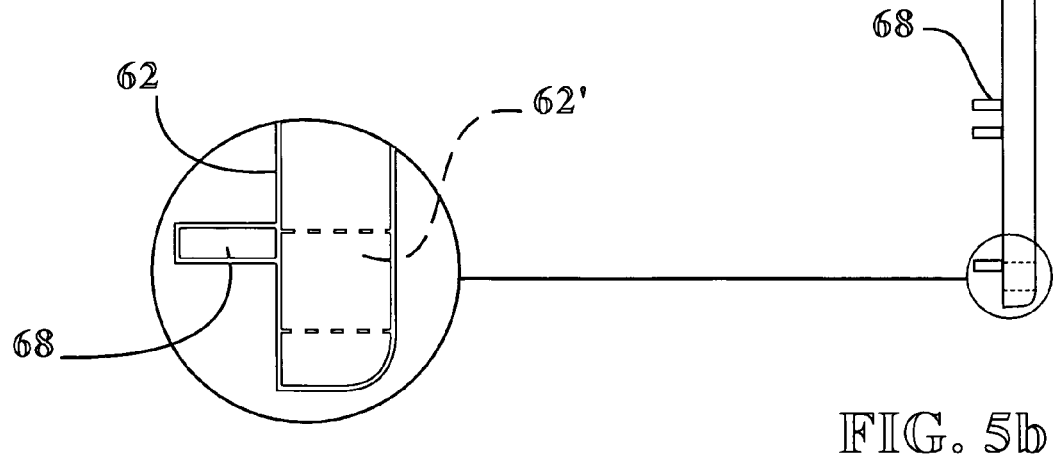
FIG. 5c
FIG. 5b

SWASHPLATE SEAL ASSEMBLY

STATEMENT REGARDING FEDERALLY SPONSORED RESEARCH OR DEVELOPMENT

The invention described herein may be manufactured, used and licensed by or for the Government for governmental purposes without the payment to the inventors and/or the assignee of any royalties thereon.

CROSS-REFERENCE TO RELATED APPLICATIONS

Not Applicable.

BACKGROUND OF THE INVENTION

1. Field of the Invention

The invention relates to a seal assembly for aviation rotor bearings. More specifically, the invention relates to a swashplate seal assembly for protection of rotorcraft bearings associated with a rotor shaft unit.

2. Description of the Related Art

Conventional rotorcrafts such as helicopters and tilt wing aircraft having propulsion systems which are adjustable in positioning angle, typically include rotor shaft units having one or more rotor bearing ring assembles which are accompanied by swashplate assemblies. Examples of conventional helicopter swashplate assemblies are provided in U.S. Pat. No. 4,804,315, issued to Ferris et al., U.S. Pat. No. 5,071,319, issued to McCafferty, and U.S. Pat. No. 5,074,494, issued to Doolin et al. A large number of maintenance issues arise in the swashplate assembly and the rotor bearing ring assembly due to wear in all parts, binding of seals, metal fatigue in the rotor bearing ring, and bearing spalling leading to abnormal wear of bearings and associated components. One method to reduce the frequency of inspections for the swashplate assembly and rotor bearing ring is to provide ample lubrication of the parts, although such lubrication rapidly deteriorates due to exposure to environmental contaminants such as dust, pollen and moisture. Frequent cleaning of a rotor shaft assembly outer surfaces and shaft seals leads to water seeping down the rotor shaft to the rotor bearing ring if a swashplate seal assembly is in a state of degradation due to exposure to contaminants and/or frequent disassembly during inspections of the rotor bearing ring.

The U.S. Army utilizes a system of frequent inspections of swashplate assemblies as determined by the frequency of problems observed during field operations of helicopters. Due to the logistics of operating a helicopter for military use, any potential failure of parts as indicated by inspection findings and partial failures is consider highly significant due to a risk of loss of life when helicopter seal assemblies fail. During the prior decade of helicopter operations, a significant number of problems relating to helicopter swashplate assemblies have occurred due to stress fractures in rotor bearing cages and/or bearing components contact leading to abnormal bearing component wear which leads to catastrophic results. In order to prevent catastrophic results, frequent and extensive rotor shaft, rotor bearing cage, and swashplate seal assembly inspections are accomplished, with resulting loss of helicopter flight time.

A need exists for an improved swashplate seal assembly for a helicopter rotor shaft in order to minimize the exposure of contaminants to the rotor bearing unit of a rotor shaft assembly. An additional need exists for an improved swashplate seal assembly and method of use providing for reduced frequencies of inspections and a more efficient inspection of the swashplate seal assembly and rotor bearing unit.

BRIEF SUMMARY OF THE INVENTION

A swashplate seal assembly is disclosed for protection of a rotor bearing unit as utilized in-the aviation industry for helicopter rotor units. The seal assembly is positioned outboard of one or more rotor bearing rings encircling a rotor shaft. The seal assembly provides improved protection of rotor bearing ring bearings from exposure to moisture and environmental contaminants to maximize operation during flight, to reduce frequency of inspections for rotor bearing and seals, and to reduce the time of each inspection for rotor bearings, seals and associated rotating parts utilized in rotor shaft units. The swashplate seal assembly includes an outer segmented cover encircling the rotor shaft. The outer segmented cover is positioned to cover a sealing ring including an inner circumference on which one or more resilient sealing members are inwardly disposed. The outer segmented cover, sealing ring and resilient sealing members are sectioned into a multitude of respective like-configured curved segments for ease of disassembly without removal of all curved segments during rotor shaft inspections. A flanged seal ring is positonable inboard of the sealing ring and includes an outer surface having an outer diameter sufficiently limited to allow the seal ring to be positioned within, and preferably in sliding contact with, the resilient sealing members. The seal ring is fitted on an outer perimeter of a bearing retainer sized to be positioned within the sealing ring to slidingly engage the seal ring outer surface within the resilient sealing members during rotor shaft rotation. The outer cover positioning and the engaging relationship between the seal ring and sealing ring resilient sealing members operate to minimize contaminants intrusion along a length of the rotor shaft and in rotor bearing ring(s) encircling the rotor shaft. A process of assembly and disassembly is also disclosed herein for the swashplate seal assembly.

BRIEF DESCRIPTION OF THE DRAWINGS

The present invention is illustrated in the drawings in which like element numbers represent like parts in each figure, including:

FIGS. 5a–5c are various views of a spacer ring positionable under the sealing ring, with the spacer ring having a plurality of connector pins thereon;

DETAILED DESCRIPTION OF THE INVENTION

Figure 1:
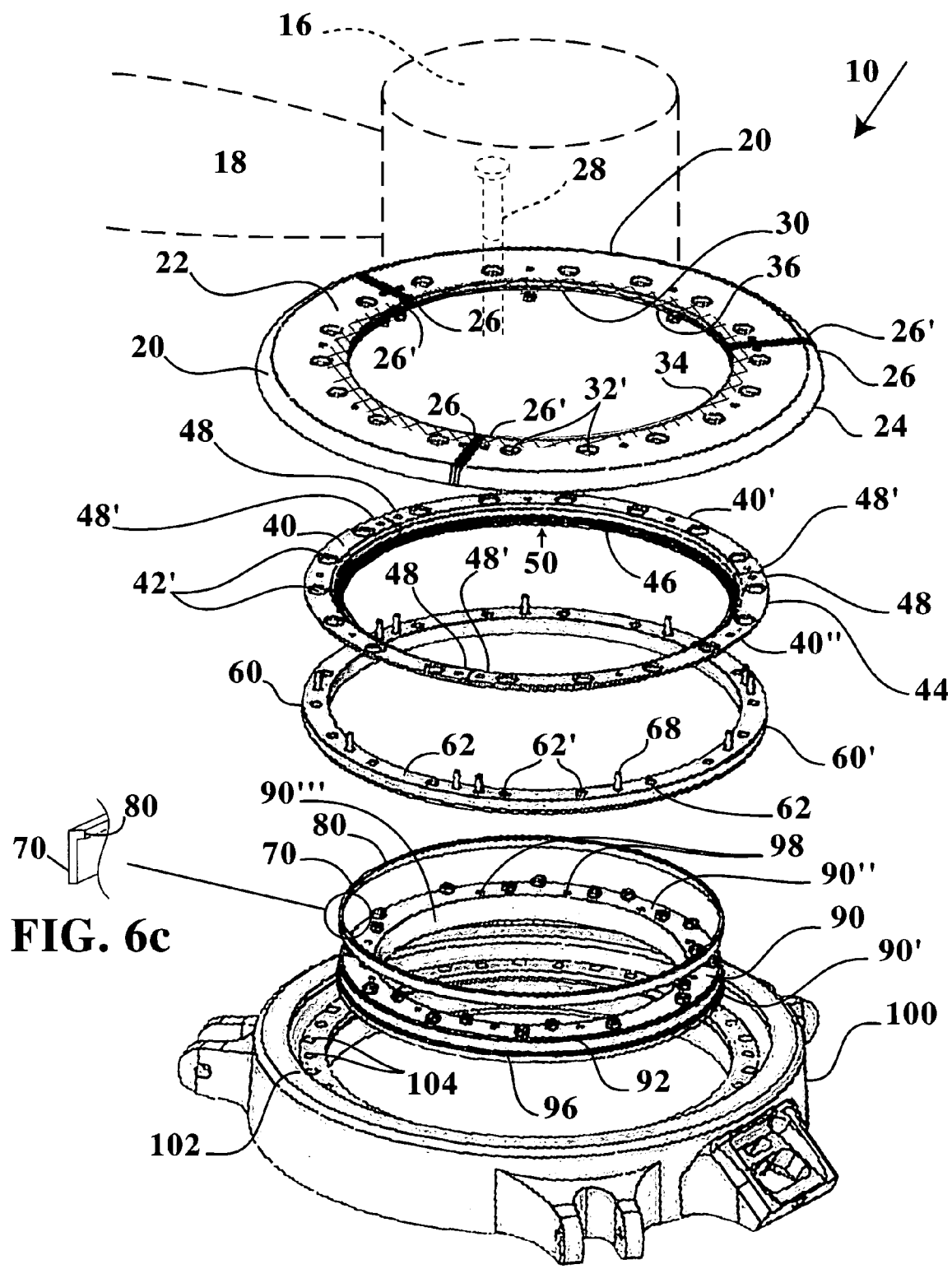
FIG. 1 is an exploded view of one embodiment of a swashplate seal assembly of the present invention.

Referring to FIGS. 1 through 7, a swashplate seal assembly 10 is disclosed through which a rotor shaft 14 is rotatable as is typical of a helicopter rotor unit extending from a transmission coupled to an engine unit. The rotor shaft 14 extends along its rotational axis 14' to a distal blade rotor hub 16 on which a plurality of helicopter blades 18, 18', 18" extend. The swashplate seal assembly 10 is stacked in coaxial orientation around the rotational axis 14', with the seal assembly 10 being positioned to rotate within a rotor ring unit 100 which is releasably attachable to a rotor hub assembly 12 composed of a rotor base ring 150, through which a rotor shaft 14 extends to a distal blade rotor hub 16 from which a plurality of helicopter blades 18 radially extend. The stacked, interlocking alignment, and cooperative function of the multiple layers of the swashplate seal assembly 10 provide for improved protection of a helicopter rotor bearing ring unit 110 from excessive bearing wear resulting from unprotected exposure to moisture, particulates, and other contaminants during operations throughout the world.

An outer cover 20 is composed of three like-configured tri-segments 20, 20', 20", with each tri-segment curved in approximately a 120 degree arc to form a circular outer cover 20 when assembled. An exterior faced surface 22 and outer perimeter 24 can include either a beveled outer perimeter (not shown), or a downwardly curved perimeter edge 24 (see FIGS. 1 and 3a–3c). Each mating end of a first tri-segment 20 includes matched ends 26, 26' configured to readily connect for assembly, or to be separately removed, without a requirement for removing the other two tri-segments 20', 20". One skilled in the art will recognize that alternative embodiments of the tri-segments 20, 20', 20" can include a two-segment outer cover or a greater number of segments for the outer cover, with each segment being like-configured to allow one or a few segments to be removed without removing all of the segments of the outer cover. The outer cover 20 illustrated in FIG. 1 includes an underside surface 30 serving as a receiving surface 32 for a sealing ring 40 to be positioned below the outer cover 20. A curved underside 32 of the outer perimeter 24 is configured to overlap an upwardly faced surface of rotor ring unit 100 (see FIG. 7). The exterior faced surface 22 includes a plurality of connector holes 32' and a plurality of aligning holes 32" therein, and further includes an interior circumference 34 on which a coating 36 such as a flouroelastomer material similar to Viton®, or a comparable elastomer coating 36 is coated. The coating 36 can be extended on to the underside surface 30 of each tri-segments 20, 20', 20", and serves to provide protection for the interior circumferential surface 34 from deterioration due to exposure to hydro-carbons, and to improve the sealing properties for the interior circumferential surface 34 when in an overlaying orientation for an underlying segmented sealing ring 40, and an interior positioned flanged seal ring 70 (discussed hereinbelow). The segmented outer cover 20, 20', 20" and the segmented sealing ring 40, which are stacked during assembly and are secured by a plurality of bolts 28, provide the ability to replace any or all of the overlying segments of the swashplate seal assembly 10 without any lower bearing component such as the rotor bearing ring unit 110 being removed, and without removal of all major fastening bolts 28.

An outer sealing ring 40 is removably positioned below the outer cover 20 to provide a second outer barrier to minimize moisture. particulates. and other contaminants from reaching the Inner rotor bearing ring unit 110. One configuration for the sealing ring 40 Is three like-configured tri-segments 40, 40', 40" (see FIGS. 1 and 4a–4c). Each tri-segment 40, 40', 40" is curved in 120 degree arcs to form a circular sealing ring 40 when assembled. Each tri-segemant 40, 40',40" includes an upwardly faced contact surface 42 having connector holes 42' and aligning holes 42" therein. Each tri-segment 40, 40', 40" further includes matched ends 48. 48' configured to readily connect to like-configured tri-segment ends 48, 48' of other tri-segments for assembly. Any one or more tri-segments are separately removed, after removal of the overlying outer cover tri-segments 20, 20', 20", without a requirement for removing the other two tri-segments 40', 40". One skilled In the art will recognize that alternative embodiments of the tri-segments 40. 40', 40" can include two-segments or a greater number of segments composing the sealing ring. with each segment being like-configured to allow one or a few segments to be removed without removing all segments of the sealing ring 40. An outer circumference 44 is sized to readily fit in an underlying stacked configuration below and inwardly the outer cover 20. An Inner circumference 46 Is sized to allow the flanged seal ring 70 to be inserted within the inner circumference 46 as discussed further hereinbelow (see FIG. 1).

An inwardly faced surface of the sealing ring inner circumference 46 includes a resilient sealing wiper system 50 bonded thereto. One embodiment for the sealing wiper system 50 includes a first wiper arcuate surface 52, and a second wiper arcuate surface 54, to form a pair of inwardly and upwardly directed arcuate surfaces shaped in a double lip or wiper configuration (see FIGS. 4a–4c). A preferred configuration provides at least one, and preferably both, wiper arcuate surfaces 52, 54 to extend inwardly 56 from the inner circumference 46 for a sufficient length to allow at least one, and preferably both, wiper arcuate surfaces 52, 54 to contact an outer circumference 72 of flanged seal ring 70 when extended within sealing ring 40 upon assembly of the swashplate seal assembly 10 (see FIGS. 1 and 7).

A spacer ring 60 is removably positioned below the sealing ring 40. One configuration for the spacer ring 60 includes an outer perimeter surface 60' having an adequate depth sufficient to position the outer cover 20 apart from the bearing retainer 90 and the rotor ring unit 100. The spacer ring 60 depth, when stacked with the sealing ring 40, allows the seal ring 70 outer circumferential surface 72 to be maintained in sliding engagement within the resilient wiper members 52, 54 of the sealing ring 40 during rotation of the rotor shaft 14 about its rotational axis 14'. The spacer ring 60 further includes the outer faced perimeter surface 60', an inner circumferential surface 64, and an upper contact surface 62. A plurality of holes 62' are extended through the upper contact surface 62 in a spaced apart orientation allowing alignment with sealing ring holes 42' and outer cover holes 32' when the swashplate seal assembly LO is stacked in alignment with the rotor ring unit 100 during rotation of the rotor shaft 14 about its rotational axis 14' (see FIGS. 1 and 2). A plurality of connector pins 68 are extended upwardly from the upper contact surface 62. In the embodiment illustrated in FIGS. 5a–5c, about a dozen connector pins 68 are installed in spaced apart configuration, with each pin 68 extended upwardly from the upper contact surface 62. The spacer ring 60 further provides an increase in the stiffness of the sealing ring 40 installed above the spacer ring 60, and provides for proper positioning for the sealing ring 40 and outer cover 20 when reassembled after each inspection of the swashplate seal assembly 10 and rotor hub assembly 12.

An inner flanged seal ring 70 is positioned in a 'shrink-fit' relationship on an outer circumference of the upper bearing retainer 90 (see FIGS. 1 and 6a–6c). The configurations of the seal ring 70 and the upper bearing retainer 90 are sized to allow the seal ring 70 to extend upwards within the spacer ring 60 inner circumference 64 and within the outer sealing ring 40 inner circumference 46, upon assembly of the seal assembly 10 for positioning partially within and partially above a rotor ring support unit 100 (see FIG. 1). The seal ring 70 is composed of a metal or composite material, with one metal material used being a hardened stainless steel metal. The seal ring 70 includes a generally vertical outer surface 72 against which contact is maintained by the double wiper arcuate surfaces 52, 54 when assembled for rotor rotation. An upper portion of the seal ring includes a generally horizontal upper surface 74, against which the Interior circumference 34 of the outer cover 20 rests when assembled for rotor rotation. The seal ring includes a seal ring inner corner 76 and an inner circumferential surface 78 which is 'shrink-fit' on the outer perimeter surface 90' of upper bearing retainer 90.

Figure 6A:
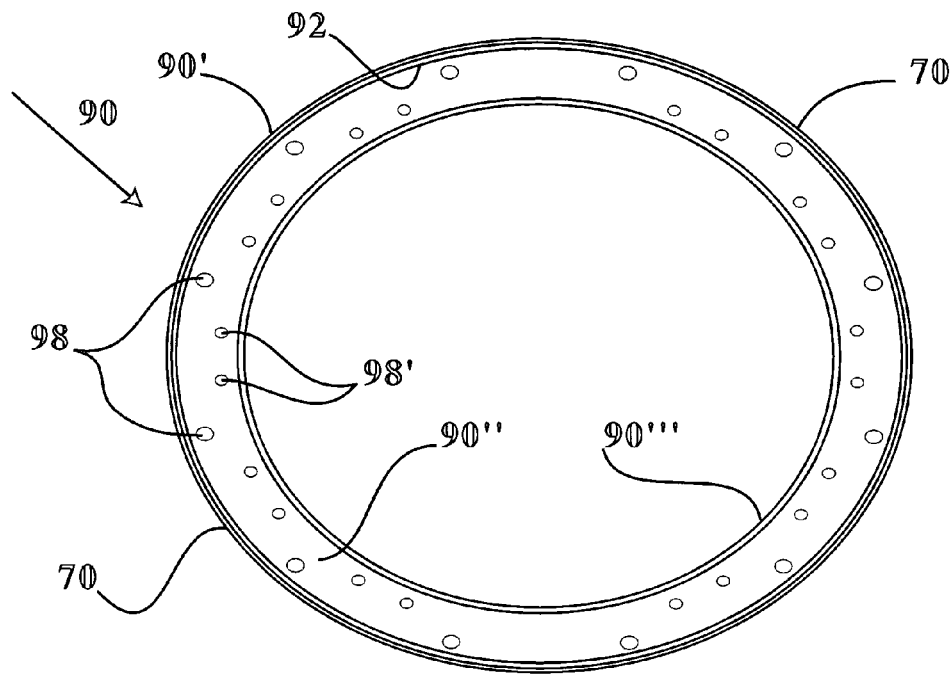
FIGS. 6a–6c are various views of a flanged seal ring disposed on an outer perimeter of a bearing retainer which is positionable interior of the sealing ring.
Figure 6B:
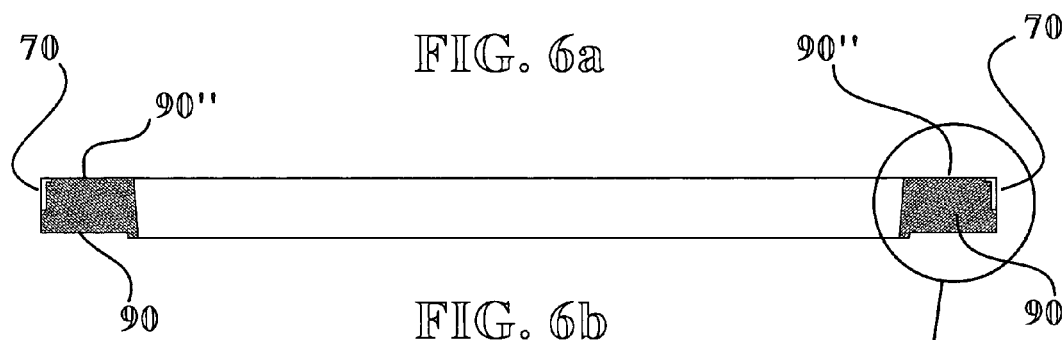
Figure 6C:
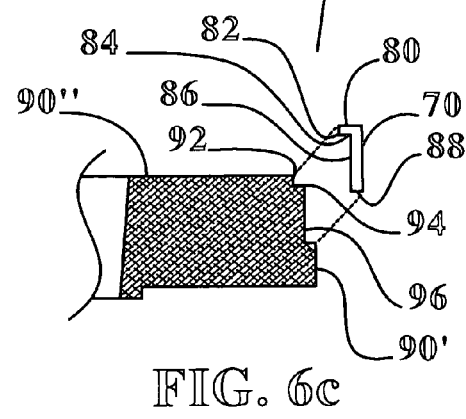
Figure 7:
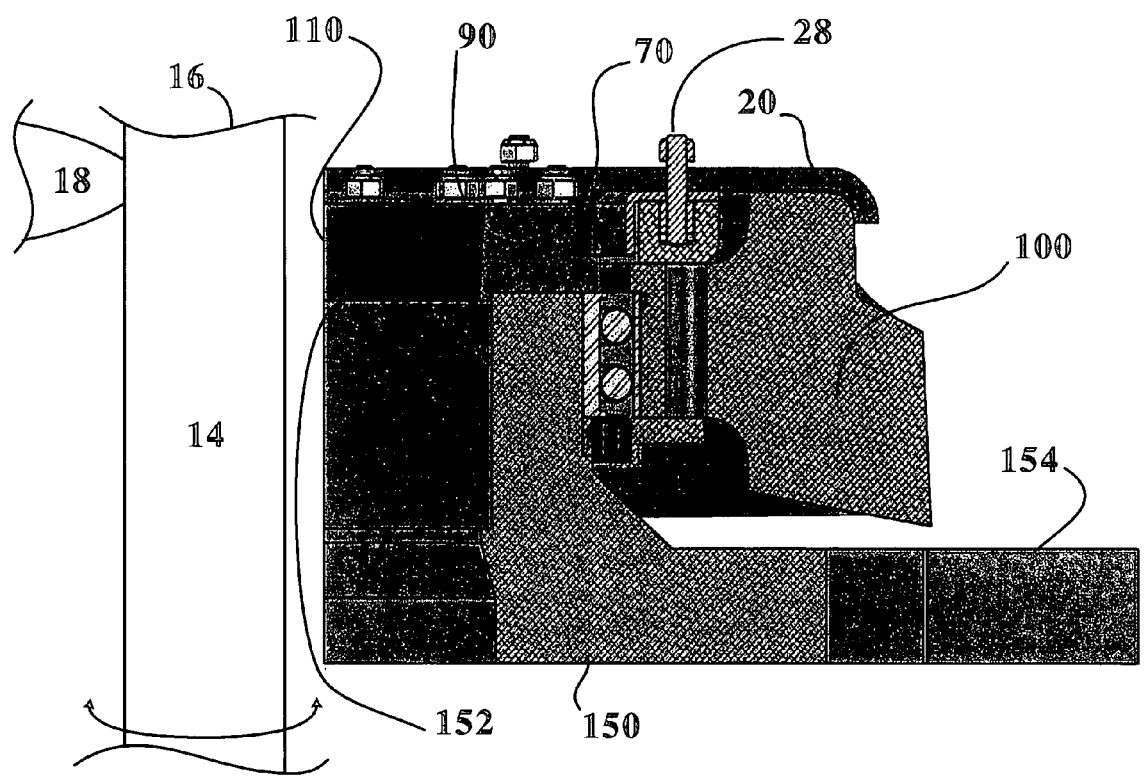
FIG. 7 is a cross-section of an assembled rotor support unit including a rotor bearing ring unit and the swashplate seal assembly.

The seal ring 70 further includes an upper flanged extension 80 having an inwardly oriented ledge surface 82 extended radially inwards from the seal ring inner corner 76 (see FIG. 6c). The ledge surface 82 extends inwardly to a corner 84 which is fitted into an upper surface groove 92 formed in an outer perimeter surface 90' of the upper bearing retainer 90. When the seal ring 70 is positioned in a 'shrink-fit' relationship with the outer perimeter surface 90', an interior seal ring surface 86 is positioned against the outer perimeter surface 90', and the seal ring interior corner 84 is fitted against an outer surface corner 94 of the upper bearing retainer 90. One embodiment includes the interior seal ring surface 86 being inset into a circumferential groove 96 in the upper bearing retainer outer perimeter surface 90' (see FIG. 6c). One embodiment for the lower end of the seal ring 70 includes an arcuate or tapered tail end 88 which is inset into a reverse tapered lower edge of the circumferential groove 96. The flanged seal ring 70 is replaceable from its shrink-fit contact against the outer circumference surface 90' of the upper bearing retainer 90, when wear is discovered during inspections, thereby allowing for replacement of the seal ring 70, without requiring disruption of the rotor bearing ring unit 110 and other internal rings and spacers composing the rotor hub assembly 12.

The upper bearing retainer 90 includes outer circumference surface 90' configurations disclosed above, including the upper surface groove 92, outer surface corner 94, and circumferential groove 96, which serve to increase the longevity of the 'shrink-fit' bonding of the seal ring 70 and upper flanged extension 80 against the upper and outer portions of upper bearing retainer 90. The upper bearing retainer 90 includes a plurality of aligning holes 98, 98' spaced apart and extending through an upper connecting surface 90" in order to align with respective holes in a rotor bearing ring base unit 150 on which the upper bearing retainer 90 is positioned. The upper bearing retainer 90 further includes an internal circumference 90''' which is adequately sized to allow a rotor shaft 14 to rotate freely therein. An additional embodiment of the bearing retainer 90 includes a base outer diameter having a greater diameter than an outer diameter of upper connecting surface 90". A rotor ring unit 100 is positioned to cradle the base of the upper bearing retainer 90 within an interior supporting surface 102 (see FIG. 1). One skilled in the art will recognize alternative configurations for a rotor ring unit are readily utilized with the seal assembly 10, while providing an interior supporting surface 102 of sufficient diameter and surface area to receive stacked components of a spacer ring 60 and sealing ring 40. A plurality of connector holes 104, and bolts 28 are provided for securing at least one spacer ring 60 against interior supporting surface 102 of the rotor ring unit 100.

A multitude of observations regarding prior helicopter rotor seal partial or full failures have lead to implementation of increased frequency of rotor seal inspections for numerous models of helicopters. The swashplate seal assembly 10 provides a multitude of benefits due to a design which provides structurally improved seal arrangements, provides more resilient sealing configurations which lead to reduced seal failures, reduced frequency of inspection sessions for helicopter rotor seals, and reduced length of each inspection session when the helicopter is not flying. The seal assembly 10 maintains the integrity of the seal ring 70 and upper flanged extension 80 in relation to the upper bearing retainer 90 and the lower surfaces of the outer cover 20, and further maintains the sliding and contacting orientation of the sealing ring 40 wiper arcuate surfaces 52, 54 against the outer circumferential surface 72 of seal ring 70, thereby minimizing contamination reaching the bearing 114 rotatably disposed in the rotor bearing ring unit 110. A further benefit for the assembled and installed seal assembly 10 is the stacked configuration of the sealing ring 40, spacer ring 60, flanged seal ring 70 and upper bearing retainer 90 provide additional stiffness to the bearing shoulder 112 of the rotor bearing ring unit 110 which decreases the effects of rotating bearing ring shoulder deflection during flights. Helicopters utilized for military and commercial purposes have experience metal fractures in areas proximal of the bearing ring shoulder. In addition to the above stated benefits, the configuration of the swashplate seal assembly 10 reduces the length of time for a major inspection for metal fractures in the rotor bearing ring unit 110, and is designed to delay an onset of metal fractures in the bearing ring shoulder.

Figure 2:
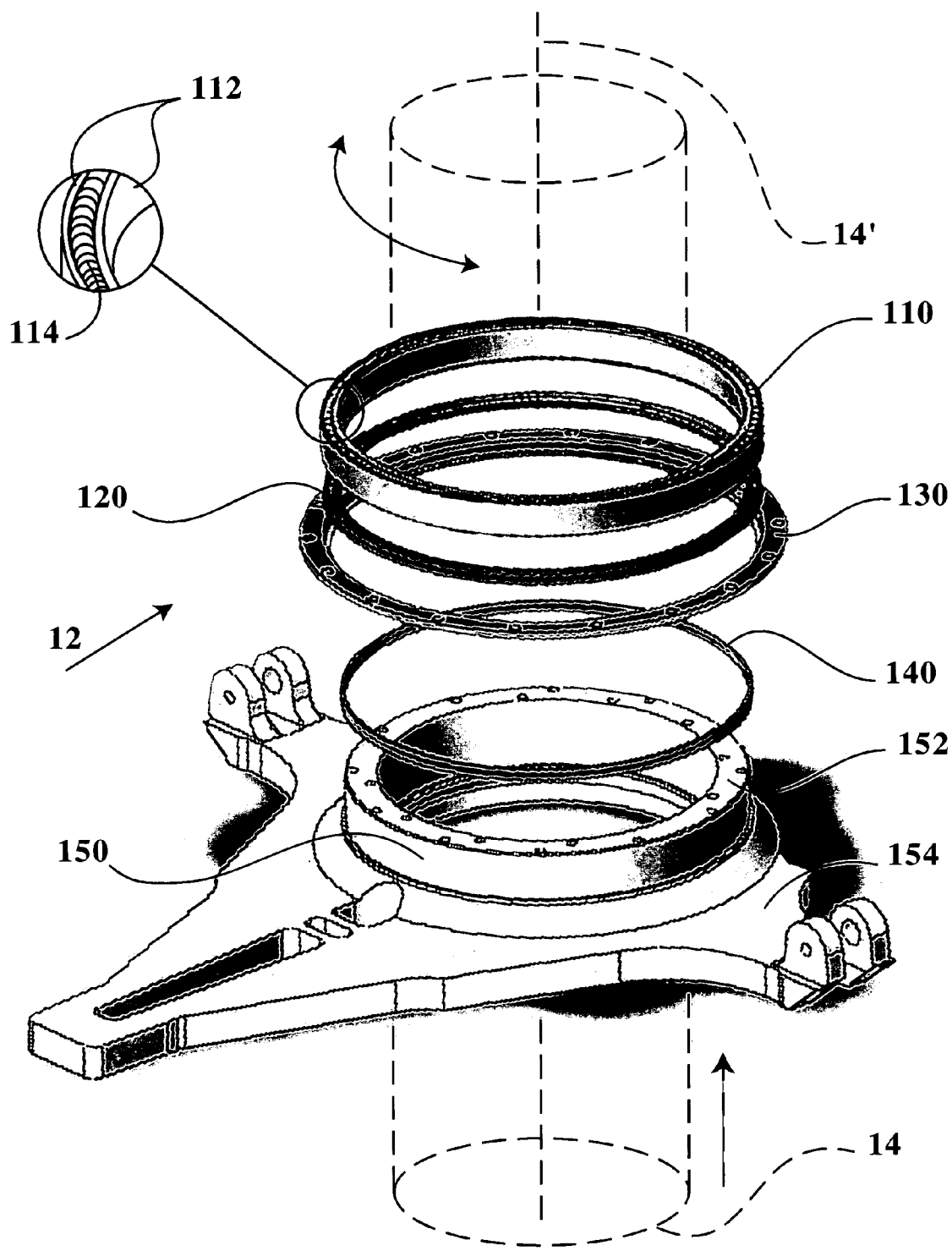
FIG. 2 is an exploded view of a rotor support unit including connecting rings, spacers and a bearing ring through which a rotor shaft extends.
Figure 3A:
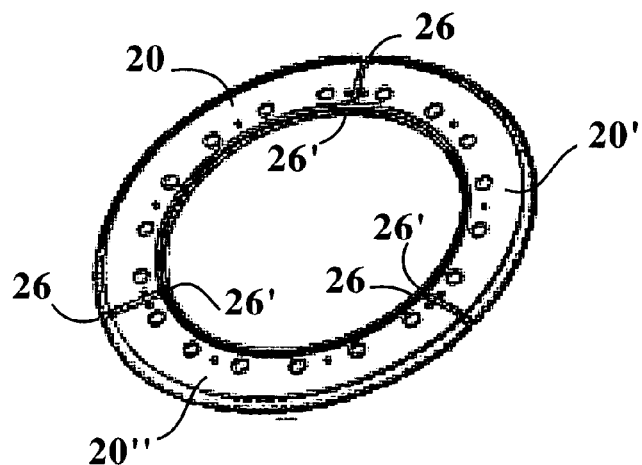
FIGS. 3a–3c are various views of a sectioned outer cover illustrated in FIG. 1.
Figure 3B:
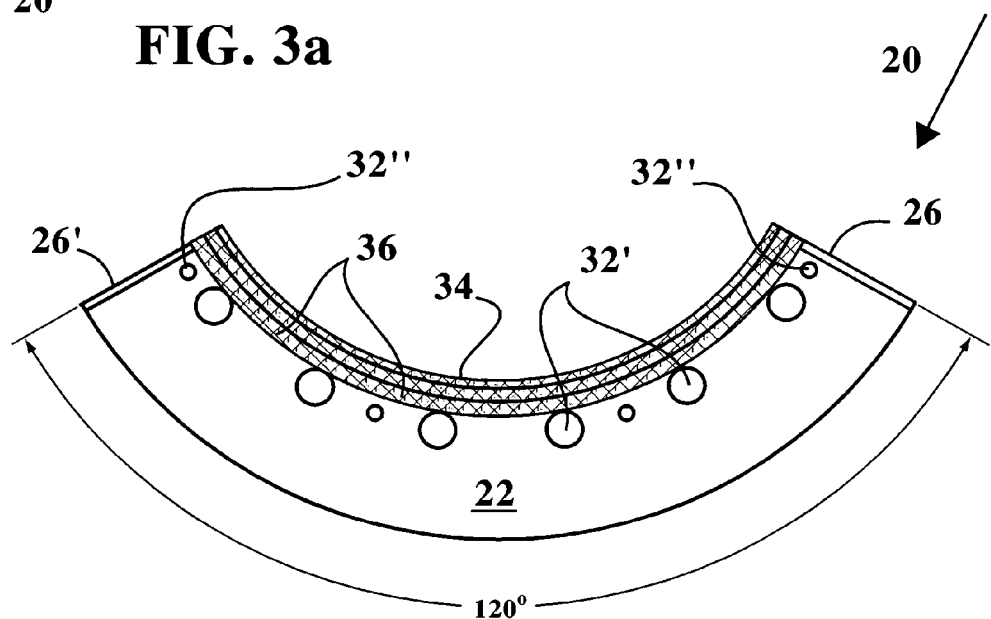
Figure 3C:
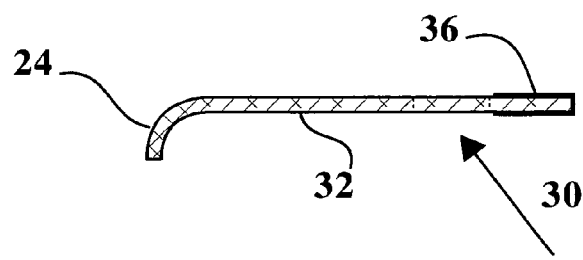
Figure 4A:
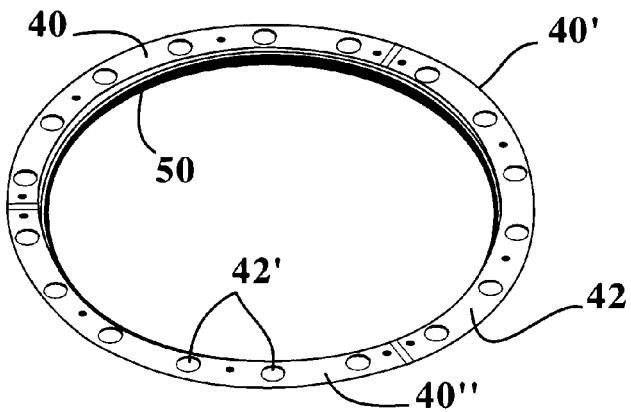
FIGS. 4a–4c are various views of a sectioned sealing ring positionable under the outer cover, with the sealing ring having an inner circumference from which one or more resilient wiper members extend inwardly.
Figure 4B:
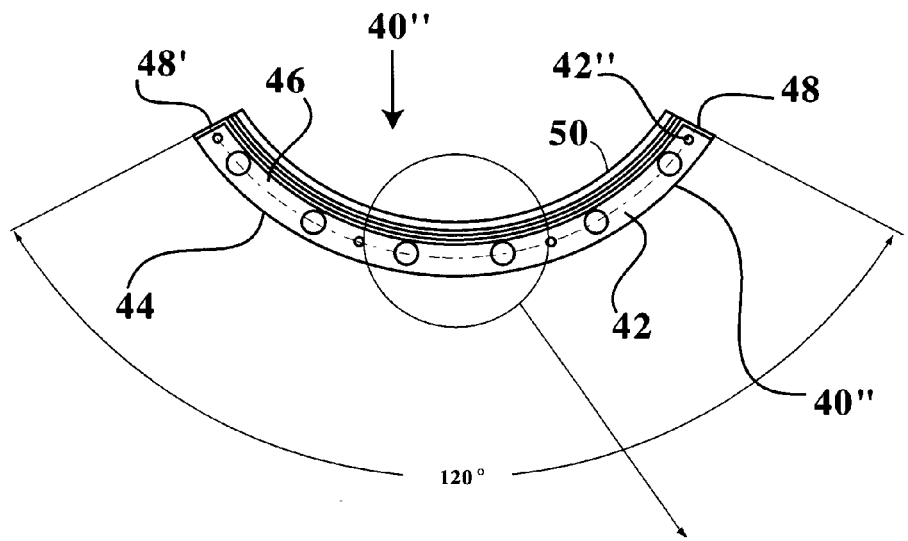
Figure 4C:
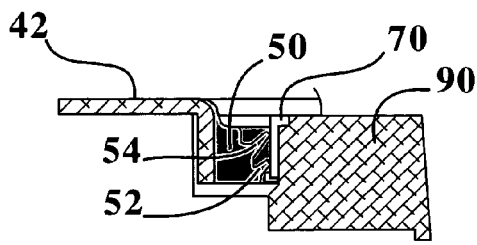

One skilled in the art will recognize alternative configurations for a rotor bearing ring unit 110 positioned to rotate under and/or within an internal circumference of the rotor ring unit 100, are utilizable other than those illustrated in FIGS. 1 and 2. In the illustrated embodiment, a stacked group of components is provided for the rotor hub assembly 12, including at least one spacer ring 120, at least one connector ring 130, and at least one positioning ring 140, which are each removably disposed on a rotor bearing ring base 150, proximal of a support surface 152 extended from a base 154 through which a rotor shaft 14 extends. One skilled in the art will recognize alternative configurations for the rotor bearing ring base 150 are utilizable for different sized rotor ring unit 100 and swashplate seal assembly 10.

The swashplate seal assembly 10 provides for an efficient process of assembly, operational use, partial or full disassembly, and inspection of the swashplate seal assembly 10, the rotor ring unit 100 and a coaxially positioned rotor bearing ring unit 110. A process of assembly includes steps of: (a) fitting a flanged seal ring 70, 80 on an outer circumferential surface 90' of an upper bearing retainer 90, (b) disposing the bearing retainer 90 having the flanged seal ring 70, 80 into an inner circumference 64 of a spacer ring 60 stacked under a sealing ring 40, (c) positioning the stacked seal ring 70, 80, spacer ring 60 and sealing ring 40 against and/or within a supporting surface 102 of the rotor ring unit 100, and (d) covering the stacked seal ring 70, 80, spacer ring 60 and sealing ring 40 with a segmented outer cover 20. A process of disassembly, either partial or full disassembly, is accomplished in reverse order as provided above. The assembled swashplate seal assembly 10 is configured to be in coaxial orientation with the rotor ring unit 100 and a rotor bearing ring unit 110. One sealing process improvement is provided by the sealing ring inner circumference 46 including a sealing ring wiper system 50 having at least one sealing wiper arcuate surface 52, and preferably two wiper arcuate surfaces 52, 54, which have arcuate surfaces extending inwardly to slidingly contact against the outer circumference 72 of the flanged seal ring 70. An additional sealing process improvement is provided by the seal ring flange 80 being positioned on an upper surface 90" of the upper bearing retainer 90, for contact against the underside 32 of the outer cover 20, thereby providing at least two sealing processes which provide multiple barriers to infiltration of environmental contaminants into lubricating materials disposed on a perimeter surface of the rotor shaft 14, and minimizing contaminants from reaching the rotor bearing ring unit 110.

A third barrier from transmission of environmental contaminants is provided by an exterior curved perimeter surface 24 forming the exterior diameter of the outer cover 20, with the exterior curved perimeter surface covering the internal components of the seal assembly 10 and also providing overlap proximal of a supporting surface 102 of the rotor ring unit 100. The swashplate seal assembly 10 is utilized by positioning a rotor shaft 14 through an inner circumference of each stacked component, including the bearing retainer 90, the flanged seal ring 70, 80, the spacer ring 60, the sealing ring 40 and the outer cover 20, in order to allow unhindered rotation of the rotor shaft 14, while minimizing moisture and other environmental contaminants from progressing past the outer cover 20, or the sealing ring wiper system 50, or the flanged seal ring 70, 80, thereby minimizing contaminants reaching the rotor bearing ring unit 110. The swashplate seal assembly 10 is readily disassembled, either partially or fully, by removing respective bolts 28 or connectors, and by detaching one or more of the three segments of the outer cover 20, 20', 20", and one or more of the three segments of the sealing ring 40, 40', 40", thereby allowing inspection of the sealing ring wiper system 50, and the flanged seal ring 70, 80 without removal of the rotor ring unit 100 or rotor bearing ring unit 110.

The swashplate seal assembly 10 provides a minimal number of additional ring and spacer members 40, 60, and sealing configurations 50, 70, 80, 90, and provides for reduction in contaminants reaching the rotor bearing ring unit 110 during helicopter flight time. In addition, the seal assembly 10 provides for reduction in contaminants reaching the rotor bearing ring unit 110, and improves retention of lubricating materials proximal of wiper end surfaces 52, 54 and retention on the outer circumference of the rotor shaft 14, during ground cleaning of outer surfaces of the blade rotor hub 16 and blade 18 surfaces, provides for reduction in the frequency of inspections for the rotor bearing ring unit 110 and associated outboard and inboard stacked rings and positioning members, and further provides for reduction in the person-hours required to complete each inspection and to correct any malfunctioning and potentially defective parts identified during an inspection.

While numerous embodiments and methods of use for this invention are illustrated and disclosed herein, it will be recognized that various modifications and embodiments of the invention may be employed without departing from the spirit and scope of the invention as set forth in the appended claims. Further, the disclosed invention is intended to cover all modifications and alternate methods falling within the spirit and scope of the invention as set forth in the appended claims.

What is claimed is:

1. A rotor shaft seal assembly associated with a rotor shaft, comprising:
    an outer cover removably positionable to encircle a rotor shaft, said outer cover having a first upper faced surface in which a plurality of outer cover connector holes are disposed in spaced apart orientation;
    an outer sealing ring removably positionable under said outer cover, said outer sealing ring having an inner circumference from which a resilient sealing wiper is radially disposed inwardly toward the rotor shaft, said outer sealing ring having a second upper faced surface in which a plurality of outer sealing ring connector holes are spaced apart in alignment with said outer cover connector holes;
    an inner seal ring removably positionable inboard of said outer sealing ring, said inner seal ring including an outer circumferential surface having a diameter sufficiently limited to provide positioning of said inner seal ring outer circumferential surface in slidingly engaging relationship with said inwardly disposed resilient sealing wiper; and
    a bearing retainer is positionable interior of said outer sealing ring inner circumference, said bearing retainer including an outer perimeter surface on which said inner seal ring is fitted, said bearing retainer further including an upper faced connecting surface having a plurality of alignment holes therein, and said bearing retainer further including an inner circumference of a sufficient radius for unhindered rotation of the rotor shaft therein.

2. The seal assembly of claim 1, further comprising a spacer ring disposed in stacked orientation under said outer sealing ring, said spacer ring including:
    a depth sufficient to position said outer cover apart from said bearing retainer;
    a third upper faced surface in which a plurality of connector holes are spaced apart in alignment with said outer sealing ring connector holes; and
    an inner circumference of said spacer ring having a sufficient radius for unhindered rotation of the rotor shalt therein;
    whereby said spacer ring provides sufficient depth for stacked orientation of said outer sealing ring and said spacer ring under said outer cover to allow said inner seal ring outer circumferential surface to be maintained in sliding engagement within said resilient sealing wiper of said outer sealing ring during rotation of the rotor shaft within said bearing retainer.

3. The seal assembly of claim 2 wherein said inner seal ring including a flanged upper portion extended inwardly for positioning against said upper surface of said bearing retainer, said flanged upper portion having an upper surface against which said outer cover is removably positioned when said inner seal ring and bearing retainer are positioned within said resilient sealing wiper of said outer sealing ring.

4. The seal assembly of claim 3 wherein said bearing retainer further including:
    an upper surface groove formed in an outer diameter of said upper faced surface proximal of said bearing retainer; and
    an outer circumferential groove in said outer perimeter of said bearing retainer;

whereby said inner seal ring flanged upper portion is form fitted in said upper surface groove and said inner seal ring inner surface being form fitted in said outer circumferential groove in said outer perimeter of said bearing retainer thereby said inner seal ring retains its fitted position on said bearing retainer during the engaging relationship of said inner seal ring outer circumferential surface with said sealing wiper of said outer sealing ring.

5. The seal assembly of claim 1 wherein said outer cover including a plurality of curved cover segments having releasably connectable ends, said plurality of curved cover segments being connectable end to end to encircle the rotor shaft, wherein each of said plurality of curved cover segments are individually detachable from said outer sealing ring without removal of all curved cover segments for ease of disassembly without removal of all curved cover segments during inspections of the rotor shalt.

6. The seal assembly of claim 5 wherein said outer sealing ring including a plurality of curved seal segments with each seal segment having releasably connectable ends and having an upwardly curved sealing wiper extended inwardly therefrom, said plurality of curved seal segments being connectable end to end to form said outer sealing ring encircling the rotor shaft wherein each of said plurality of curved seal segments are individually detachable from said spacer ring without removal of all curved seal segments for ease of disassembly without removal of all curved seal segments during inspections of the rotor shaft.

7. The seal assembly of claim 6 wherein said curved seal segments including respective dual wiper segments being radially and inwardly oriented, said respective dual wiper segments forming said resilient sealing wiper in slidingly engaging relationship with said inner seal ring outer circumferential surface when said curved seal segments are connectable end to end.

8. The seal assembly of claim 1 further comprising a rotor bearing ring unit including:
an interior circumference sized for unhindered rotation of the rotor shaft therein;
an outer circumference sized to removably fit underneath said bearing retainer;
an upper supporting surface in which a plurality of aligning holes are spaced apart for alignment with said bearing retainer alignment holes upon positioning of said bearing retainer against said upper supporting surface;
whereby said rotor bearing ring unit facilitates unhindered rotation of the rotor shaft while said bearing retainer, inner seal ring, outer sealing ring and outer cover provide protection for said rotor bearing ring unit from external contaminants during rotation of the rotor shaft within said rotor bearing ring unit interior circumference.

9. The seal assembly of Claim 8 wherein said rotor bearing ring unit is releasably attachable in stacked orientation on a rotor ring base unit providing support for said rotor bearing ring unit during unhindered rotation of the rotor shaft extended through said rotor bearing ring unit and said rotor ring base unit.

10. A swashplate seal assembly for protection of a rotor bearing ring utilized for rotation of a rotor shaft, comprising:
an outer cover removably positionable to encircle a rotor shaft, said outer cover having a first upper faced surface in which a plurality of outer cover connector holes are disposed in spaced apart orientation;
an outer sealing ring removably positionable under said outer cover, said outer sealing ring having an inner circumference from which a resilient sealing wiper is inwardly disposed, said outer sealing ring having a second upper faced surface in which a plurality of outer sealing ring connector holes are spaced apart in alignment with said outer cover connector holes;
an inner seal ring removably positionable inboard of said outer sealing ring, said inner seal ring including an outer circumferential surface having a diameter sufficiently limited to provide positioning of said inner seal ring circumferential surface in engaging relationship within said resilient sealing wiper;
a bearing retainer is positionable interior of said outer sealing ring inner circumference, said bearing retainer including an upper faced connecting surface having a plurality of alignment holes therein, said bearing retainer further including an outer perimeter on which said inner seal ring is fitted, and an inner circumference of a sufficient radius for unhindered rotation of the rotor shaft therein; and
a spacer ring disposed in stacked orientation under said outer sealing ring, said spacer ring including an upper faced contact surface in which a plurality of connector holes are spaced apart in alignment with said outer sealing ring connector holes, said spacer ring having an inner circumference of a sufficient radius for unhindered rotation of the rotor shaft therein, whereby said spacer ring provides sufficient depth for stacked orientation with said outer sealing ring to allow said inner seal ring outer circumferential surface to be maintained in sliding engagement with said resilient sealing wiper of said outer sealing ring during rotation of the rotor shaft.

11. The seal assembly of claim 10 wherein said inner seal ring including a flanged upper portion extended inwardly for positioning against said upper surface of said bearing retainer, said flanged upper portion having an upper surface against which said outer cover is removably positioned when said inner seal ring and bearing retainer are inserted within said resilient sealing wiper of said outer sealing ring.

12. The seal assembly of claim 11 wherein said outer cover including a plurality of curved cover segments having releasably connectable ends, said plurality of curved cover segments being connectable end to end to encircle the rotor shaft, wherein each of said plurality of curved cover segments are individually detachable from said outer sealing ring without removal of all curved cover segments for ease of disassembly without removal of all curved cover segments during inspections of the rotor shaft.

13. The seal assembly of claim 12 wherein said outer sealing ring including a plurality of curved seal segments with each seal segment having releasably connectable ends and having a curved sealing wiper extended inwardly therefrom, said plurality of curved seal segments being connectable end to end to form said outer sealing ring encircling the rotor shaft, wherein each of said plurality of curved seal segments are individually detachable from said spacer ring without removal of all curved seal segments for ease of disassembly without removal of all curved seal segments during inspections of the rotor shaft.

14. The seal assembly of claim 13 wherein said curved seal segments including respective dual wiper segments being radially and inwardly oriented, said respective dual wiper segments forming said resilient sealing wiper when said curved seal segments are connectable end to end to encircle the rotor shaft.

15. A rotor shaft seal assembly for a helicopter rotor shaft, comprising:
- an outer cover removably positionable to encircle a rotor shaft, said outer cover having a first upper faced surface in which a plurality of outer cover connector holes are disposed in spaced apart orientation;
- an outer sealing ring removably positionable in stacked orientation under said outer cover, said outer sealing ring having an inner circumference from which a resilient sealing wiper is radially and inwardly disposed, said outer sealing ring having a second upper faced surface in which a plurality of outer sealing ring connector holes are spaced apart in alignment with said outer cover connector holes;
- an inner seal ring removably positionable inboard of said outer sealing ring, said inner seal ring including an outer circumferential surface having a diameter sufficiently limited to provide positioning of said inner seal ring circumferential surface in engaging relationship within said resilient sealing wiper;
- a bearing retainer is positionable interior of said outer sealing ring inner circumference, said bearing retainer including an upper faced connecting surface having a plurality of alignment holes therein, said bearing retainer further including an outer perimeter on which said inner seal ring is fitted and an inner circumference of a sufficient radius for unhindered rotation of the rotor shaft therein; and
- a spacer ring disposed in stacked orientation under said outer sealing ring, said spacer ring including:
  - a depth sufficient to position said outer cover apart from said bearing retainer;
  - an upper faced contact surface in which a plurality of connector holes are spaced apart in alignment with said outer scaling ring connector holes; and
  - an inner circumference of said spacer ring having a sufficient radius for unhindered rotation of the rotor shaft within said bearing retainer;
  - whereby said spacer ring provides sufficient depth for stacked orientation of said sealing ring and said spacer ring under said outer cover to allow said inner seal ring outer circumferential surface to be maintained in slidingly engagement within said resilient sealing wiper of said outer sealing ring during rotation of the rotor shaft.

16. The seal assembly of claim 15 wherein said inner seal ring including a flanged upper portion extended inwardly for positioning against said upper surface of said bearing retainer, said flanged upper portion having an upper surface against which said outer cover is removably positioned when said inner seal ring and bearing retainer are positioned within said resilient sealing wiper of said outer sealing ring.

17. The seal assembly of claim 15 wherein said outer cover including a plurality of curved cover segments having releasably connectable ends, said plurality of curved cover segments being connectable end to end to encircle the rotor shaft, wherein each of said plurality of curved cover segments are individually detachable from said outer sealing ring without removal of all curved cover segments for ease of disassembly without removal of all curved cover segments during inspections of the rotor shaft.

18. The seal assembly of claim 15 wherein said outer sealing ring including a plurality of curved seal segments with each seal segment having releasably connectable ends and having a resilient sealing wiper extended inwardly therefrom, said plurality of curved seal segments being connectable end to end to form said outer sealing ring encircling the rotor shaft, wherein each of said plurality of curved seal segments are individually detachable from said spacer ring without removal of all curved seal segments for ease of disassembly without removal of all curved seal segments during inspections of the rotor shaft.

19. The seal assembly of claim 18 wherein said curved seal segments including respective dual wiper segments being radially and inwardly oriented, said respective dual wiper segments forming said resilient sealing wiper in engaging relationship with said inner seal ring outer circumferential surface when said curved seal segments are connectable end to end.

20. The seal assembly of claim 15 further comprising a rotor bearing ring unit including:
- a sufficient interior radius for unhindered rotation of the rotor shaft therein;
- an upper supporting surface in which a plurality of aligning holes are spaced apart for alignment with said bearing retainer alignment holes upon positioning of said bearing retainer against said upper supporting surface; and
- a rotor base unit including a rotor bearing ring sized to be removably positioned under said bearing retainer, said rotor base unit having an interior circumference having a sufficient radius for unhindered rotation of the rotor shaft therein;
- whereby said rotor bearing ring unit retains said bearing retainer above said rotor bearing ring in order to maintain adequate positioning and rotation of said rotor bearing ring when said rotor bearing ring unit and said rotor base unit are connected in stacked orientation to provide support for unhindered rotation of the rotor shaft.

* * * * *